Figure 1:
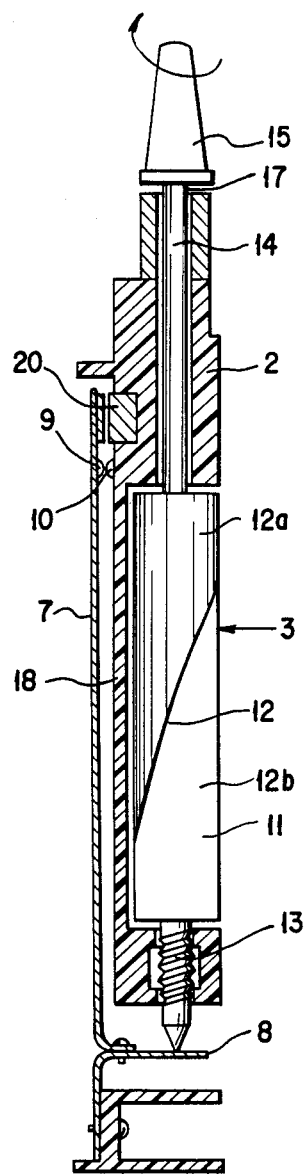

United States Patent [19]

Strada

[11] Patent Number: 4,812,626

[45] Date of Patent: Mar. 14, 1989

[54] THERMOSTATICALLY CONTROLLED ELECTRIC IMMERSION HEATER FOR AQUARIUMS

[76] Inventor: Antonio Strada, Via Interna, 44/c, 33170 Pordenone, Italy

[21] Appl. No.: 927,168

[22] Filed: Nov. 5, 1986

[30] Foreign Application Priority Data

Nov. 8, 1985 [IT] Italy .................. 61949/85[U]

[51] Int. Cl.⁴ .................. H05B 1/02; H05B 3/78; H01H 37/52
[52] U.S. Cl. .................. 219/523; 116/252; 219/331; 219/506; 337/361; 337/368; 374/198
[58] Field of Search .............. 219/523, 331, 328, 506; 337/368, 361; 374/198; 116/252

[56] References Cited

U.S. PATENT DOCUMENTS

| | | | |
|---|---|---|---|
| 1,139,185 | 5/1915 | Johnson | 374/198 |
| 2,263,988 | 11/1941 | Hardy et al. | 337/368 X |
| 2,888,537 | 5/1959 | Mears | 337/361 X |
| 3,227,128 | 1/1966 | Schmidt | 116/252 |
| 4,072,847 | 2/1978 | Craven | 219/523 |
| 4,107,514 | 8/1978 | Ellson | 219/523 |
| 4,149,067 | 4/1979 | Jager | 219/523 |

FOREIGN PATENT DOCUMENTS

| | | | |
|---|---|---|---|
| 1300058 | 6/1962 | France | 116/252 |
| 453781 | 9/1936 | United Kingdom | 219/523 |
| 680291 | 10/1952 | United Kingdom | 374/198 |
| 1053907 | 1/1967 | United Kingdom | 116/252 |
| 1373059 | 11/1974 | United Kingdom | 219/523 |
| 1449629 | 9/1976 | United Kingdom | 219/523 |

Primary Examiner—Anthony Bartis
Attorney, Agent, or Firm—Hoffman, Wasson, Fallow & Gitler

[57] ABSTRACT

A thermostatically controlled electric heater for aquariums includes within an electric waterproof envelope, a heating element and a working unit regulating the temperature, moving axially in order to vary the rest position of a bimetal strip which, depending on its deformation, opens and closes the supply circuit of the heating element. The regulation unit (3) is provided with a threaded pin (13), the end resting against the bimetal strip (7) and with a cylindrical body (11), provided on the side surface with a helical line (12) dividing the surface of the cylindrical body into two differently colored portions (12) covered by a screen (18) provided with a longitudinal slot (19) through which a short portion of said helical line (12) is visible. A grauated scale is provided along the slot and cooperates with the visible portion of the line to indicate the set operating temperature of the heater.

9 Claims, 1 Drawing Sheet

THERMOSTATICALLY CONTROLLED ELECTRIC IMMERSION HEATER FOR AQUARIUMS

The present invention relates to an immersion-type thermoregulating device, designed especially for aquariums.

Immersion-type thermoregulating devices used to maintain the aquarium water within values which are compatible with the living conditions required for the fish, are currently known. Generally, these thermoregulating devices comprise a glass container housing a heating element, preferably consisting of an electric resistance supplied from the outside through a bimetal contact.

Thermoregulating device known at this time and available on the market are designed with a fixed working temperature, i.e. they are calibrated at the factory and are used to maintain the water at the value corresponding to the calibration temperature. In reality, it would be also possible to vary the operating temperature, but generally this involves problems of a practical nature due to lack of reference values and, consequently, the need to calibrate the device by trials and by using a separate thermometer.

This represents a limitation to the use of these thermoregulating device which are then poorly adequate for use at different values than those for which they were calibrated at the factory.

Although, from a theoretical point of view, this does not present a problem, since there are already in existence more or less sophisticated thermoregulating devices which meet basically any requirements, from a practical point of view the problem does exist, since the tendency encountered in some applications to simplify the device as much as possible is in conflict with the necessary complexity involved in a system regulating the temperature to be checked.

An object of the invention is to reconcile these opposite requirements and to obtain a thermoregulating device which combines simplicity of operation with the ability to adjust the desired working temperature. Such a combination of features at the present time is not available for aquarium heaters.

Another object of the invention is to obtain a thermoregulating device which has a more pleasant exterior appearance than that of traditional units, taking into account the particular use intended which generally involves immersion of the unit in water with consequent visibility from the outside.

In accordance with the invention, these objects are achieved by an immersion-type heater for an aquarium including, within a waterproof transparent tubular envelope, an electric heating element and an adjustable temperature regulating unit controlling operation of the heating element. The regulating element includes a bimetal strip responsive to the temperature of the envelope, and axially movable adjustment means for varying the rest position of the bimetal strip and thus the operating temperature of the device. The invention is particularly directed to an improved heater of this type, comprising a threaded pin having an end resting against the bimetal strip, and a scroll-type set temperature indicator. The indicator includes a rotatable cylindrical body marked with a helical line, which is visible through a vertical slot in an adjacent screen. A graduated scale alongside the slot provides an indication of the set temperature of the heater.

Figure 2:
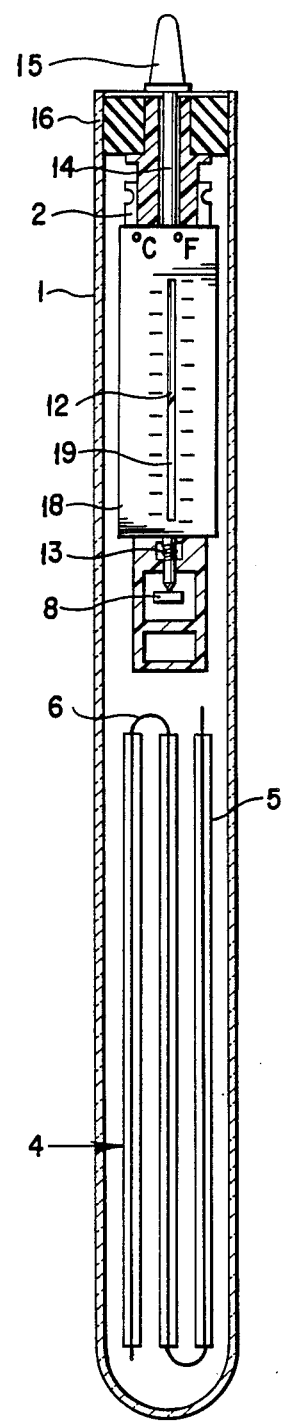
Figure 3:
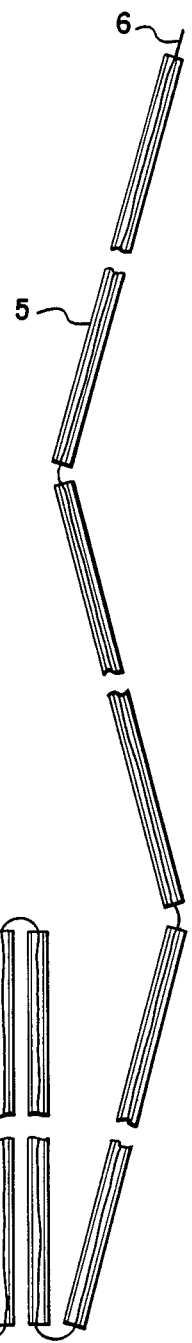

The invention is described in further details hereunder, with reference to the enclosed drawings, in which:

FIG. 1 is a longitudinal schematic section of a device according to the invention, without its cover, FIG. 2 is the same view as FIG. 1 in which the device is mounted within a glass housing, and FIG. 3 is a schematic view of a detail of the heating element.

As can be seen from these drawings, the thermoregulating device according to the invention comprises a cylindrical glass container 1, housing an insulating material body 2, with an interior hollow. A regulating unit, indicated generally at 3, is housed within the body 2.

A heating element 4, consisting of a cylindrical, hollow glass rod 5, containing an electrical resistance consisting of a Ni-Cr spiral 6 is housed in the above-mentioned glass container 1. The rod 5 is appropriately broken in several sections which are folded on each other to form a bundle.

A bimetal strip 7, running lengthwise between the controller 1 and the body 2, is fastened to the body 2 at its lower end via a flexible strip 8, having a first portion running perpendicularly to the axis of the glass container 1 and a second portion, running parallel to said axis. The bimetal strip is provided at its other end with a contact 9, referred to as mobile contact, opposite a fixed contact 10, on the body 2. A magnetic anchor 20, also provided in the body 2, eliminates any uncertainty in the electric connection between the contacts 9 and 10.

The regulating unit 3 comprises a cylindrical portion 11 provided on the lateral surface with a spiral line 12, running basically over the entire length of said cylindrical surface and dividing it in two differently colored portions. A adjustment screw 13 is applied on the cylindrical portion 11 at the inner end. This screw engages into a corresponding threaded bushing in the body 2 and rests against said flexible strip 8 of the bimetal strip 7, at the body 2 itself.

At the opposite end, the cylindrical portion 11 is affixed to a shaft 14, extending axially through the corresponding part of the body 2; this shaft is provided at its upper end with an operating knob 15.

The assembly consisting of the body 2, regulating unit 3 and heating element 4 is housed, as mentioned, within the glass container 1 and the parts are arranged so that the end part of the body 2 is sealed by a silicone resin stopper 16, which keeps the knob 15 outside the container 1, making its easy to manipulate waterproof at the same time. A water seal is also provided by the presence of a small annular gasket 17.

At the level of the cylindrical portion 11, a screen 18 is applied to the container 1; this screen 18 is provided with a longitudinal slot 19, marked on its edges with a graduated scale, preferably in Celsius and Fahrenheit degrees.

The operation of the device according to the innovation is as follows:

For a predetermined angular position of the knob 15 and, therefore, of the cylindrical portion 11, a thin vertical strip of lateral surface of this cylindrical portion 11 is visible through the longitudinal slot 19 of the screen 18 and this strip is divided by a small part of the line 12 into two differently colored portions 12a and 12b. Still at said predetermined position, due to the engagement between the screw 13 of the unit 3 and the body 2, said unit 3 is in precise axial position. Its point establishes the rest position of the bimetal strip 7 and, therefore, the distance between contacts 9 and 10.

Obviously, an exact working temperature of the device corresponds to this distance. This temperature, after appropriate calibration of the device, corresponds to the value indicated on the scale of the screen 18, at the line 12, visible through the longitudinal slot 19.

It is evident that the choice of materials, the pitch of screw 13, the wrapping intervals of line 12, the characteristics of the screen 18 must be selected in the design and/or adjustment stage of the device so that indication by line 12 on the graduated scale of the screen 18 corresponds to each one of the possible working temperatures of the device.

It is apparent from the above statements that the thermoregulating device according to the invention offers considerable advantages with respect to similar devices currently available on the market, since:

it makes it possible to evidence the working temperature for which it is preset and to vary it in the event of changes in the operational requirements. In the event that the device according to the invention is used for aquariums, this makes it possible to vary the environmental conditions, depending on the type of fish to be raised. In the case of other uses (e.g. photographic baths) it is possible to regulate the working conditions very quickly, although reliably and accurately;

it allows easy change of the conditions of operations and immediate verification of the new predetermined temperature value;

its appearance is attractive thanks to the special conformation of the heating element consisting of a bundle of thin glass tubes, obtained with a rather simple and economic process;

it makes it possible to utilize two different temperature reading scales which, thanks to the inclined layout of the portion of the index visible through longitudinal slot 19 of screen 18, makes it possible to maintain the two reading for the same temperature value on two non-opposite positions;

it makes it possible to obtain all the above-mentioned advantages without entailing any substantial increase in construction complexity or in additional materials, consequently without any substantial increase in cost of the product.

I claim:

1. In an immersion heater for an aquarium including, within a vertically disposed waterproof elongated transparent tubular envelope, an electric heating element in the lower portion of said envelope and an adjustable temperature regulating unit in the upper portion of said envelope controlling operation of the heating element, the temperature regulating unit including both a bimetal strip responsive to the temperature of said envelope and axially movable adjustment means operable from the exterior of said envelope for varying the rest position of said bimetal strip and thus the operating temperature of the device, the improvement wherein said adjustment means includes in combination a threaded pin (13) having an end resting against the bimetal strip (7) and rotatable by means extending through the upper end of said envelope to the exterior thereof, a cylindrical body (11) rotatable with said threaded pin and provided on its outer surface with a helical line (12) running over the entire length of said outer surface and dividing it into portions, a screen (18) within said envelope adjacent said cylindrical body and visible from the exterior of said envelope, said screen having a vertically disposed longitudinal slot (19) through which a short portion of said helical line (12) is visible, at least one graduated scale alongside said slot indicating temperature values which, for each angular position of said regulating unit (3) and, therefore, for each axial position of its end in contact with the bimetal strip (7), correspond to an operating temperature of the device as indicated on said scale by that portion of the helical line (12) visible through the slot (19).

2. The invention of claim 1, wherein the regulating unit (3) is supported by an insulating body (2) housed in the envelope (1).

3. The invention of claim 2, wherein said means extending through the upper portion of the envelope includes a shaft having an upper end portion extending through said insulating body and protruding from the upper end thereof, said shaft being provided with an adjustment knob (15).

4. The invention of claim 2, wherein one end of the bimetal strip (7) is fastened to the insulating body (2) and the other end is equipped with a contact (9) working jointly with another contact (10) applied to the insulating body (2) in order to establish and interrupt the electric continuity of the supply circuit of the heating element (4), as the degree of deformation of the bimetal strip (7) varies.

5. The invention of claim 4, wherein the bimetal strip (7) is attached at its end remote from contact (9) to a flexible strip (8), in turn fastened to body (2) and arranged perpendicularly to the rotation axis of said threaded pin.

6. The invention of claim 1, wherein the heating element (4) comprises a bundle of thin tubes (5), of insulating material, containing a continuous electric resistance element (6).

7. The invention of claim 6, wherein the insulating tubes (5) are made of glass.

8. The invention of claim 1, wherein the helical line (12) divides the outer surface of the cylindrical body (11) into two differently colored portions.

9. The invention of claim 3, wherein said pin, said cylindrical body and said shaft lie along a common axis.

* * * * *

REEXAMINATION CERTIFICATE (1698th)
United States Patent [19]
Strada

[11] B1 4,812,626

[45] Certificate Issued May 12, 1992

[54] THERMOSTATICALLY CONTROLLED ELECTRIC IMMERSION HEATER FOR QUARIUMS

[76] Inventor: Antonio Strada, Via Interna, 44/c, 33170 Pordenone, Italy

Reexamination Request:
No. 90/001,962, Mar. 19, 1990

Reexamination Certificate for:
Patent No.: 4,812,626
Issued: Mar. 14, 1989
Appl. No.: 927,168
Filed: Nov. 5, 1986

[30] Foreign Application Priority Data

Nov. 8, 1985 [IT] Italy .................... 619498/85

[51] Int. Cl.⁵ .......... H05B 1/02; H05B 3/78; H01H 37/52
[52] U.S. Cl. .................... 219/523; 116/252; 219/506; 337/361; 337/368; 374/198; 392/448; 392/498
[58] Field of Search .......... 219/523, 506; 337/368, 337/361; 116/252, 253; 338/196; 374/198; 392/498, 448

[56] References Cited

U.S. PATENT DOCUMENTS

3,678,434  7/1972  Brooks .................... 338/196
4,072,847  2/1978  Craven .................... 219/523

FOREIGN PATENT DOCUMENTS

0022149  1/1981  European Pat. Off.
453781   9/1936  United Kingdom .
676550   7/1950  United Kingdom .

*Primary Examiner*—Anthony Bartis

[57] ABSTRACT

A thermostatically controlled electric heater for aquariums includes within an electric waterproof envelope, a heating element and a working unit regulating the temperature, moving axially in order to vary the rest position of a bimetal strip which, depending on its deformation, opens and closes the supply circuit of the heating element. The regulation unit (3) is provided with a threaded pin (13), the end resting against the bimetal strip (7) and with a cylindrical body (11), provided on the side surface with a helical line (12) dividing the surface of the cylindrical body into two differently colored portions (12) covered by a screen (18) provided with a longitudinal slot (19) through which a short portion of said helical line (12) is visible. A grauated scale is provided along the slot and cooperates with the visible portion of the line to indicate the set operating temperature of the heater.

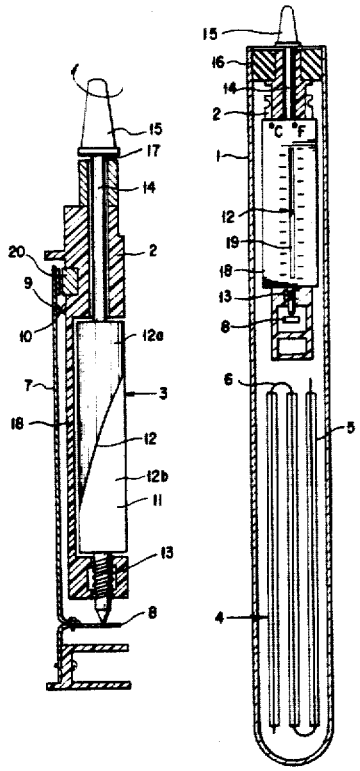

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2, 4, 5 and 8 are cancelled.

The patentability of claims 1 and 6 are determined to be patentable as amended.

Claims 3, 7 and 9 dependent on an amended claim, are determined to be patentable.

* * * * *